US012616555B2

(12) United States Patent
Prasad et al.

(10) Patent No.: US 12,616,555 B2
(45) Date of Patent: May 5, 2026

(54) DENTAL CROWN AND METHOD OF USE

(71) Applicants: Arun Prasad, Guyton, GA (US); Ron Fishell, Garland, TX (US); Steven Turley, West Jordon, UT (US); David Verity, Murray, UT (US); Gaurav Agarwal, Winchester, MA (US)

(72) Inventors: Arun Prasad, Guyton, GA (US); Ron Fishell, Garland, TX (US); Steven Turley, West Jordon, UT (US); David Verity, Murray, UT (US); Gaurav Agarwal, Winchester, MA (US)

( * ) Notice: Subject to any disclaimer, the term of this patent is extended or adjusted under 35 U.S.C. 154(b) by 0 days.

(21) Appl. No.: 17/469,064

(22) Filed: Sep. 8, 2021

(65) Prior Publication Data

US 2022/0096205 A1     Mar. 31, 2022

Related U.S. Application Data

(60) Provisional application No. 63/075,427, filed on Sep. 8, 2020.

(51) Int. Cl.
*A61C 5/30*          (2017.01)
*A61C 13/15*          (2006.01)

(52) U.S. Cl.
CPC .............. *A61C 5/30* (2017.02); *A61C 19/003* (2013.01)

(58) Field of Classification Search
CPC ........... A61C 5/30; A61C 5/00; A61C 19/003; A61C 19/004; A61C 5/7073; A61C 13/26
See application file for complete search history.

(56) References Cited

U.S. PATENT DOCUMENTS

| | | | | |
|---|---|---|---|---|
| 4,015,332 A | * | 4/1977 | Manne ..................... | A61C 5/30 |
| | | | | 433/219 |
| 4,678,435 A | * | 7/1987 | Long ........................ | A61C 5/70 |
| | | | | 433/218 |
| 5,487,663 A | * | 1/1996 | Wilson ..................... | A61C 5/70 |
| | | | | 433/223 |
| 5,927,984 A | * | 7/1999 | Lin ........................ | A61C 13/26 |
| | | | | 433/218 |
| 11,523,888 B2 | * | 12/2022 | Hansen .................... | A61C 5/20 |
| 2004/0002557 A1 | * | 1/2004 | Qian ....................... | A61K 6/869 |
| | | | | 523/113 |
| 2004/0142305 A1 | * | 7/2004 | Harlan ............... | A61C 13/0003 |
| | | | | 433/218 |
| 2004/0224284 A1 | * | 11/2004 | Saito ...................... | A61C 13/08 |
| | | | | 433/191 |
| 2005/0244770 A1 | * | 11/2005 | Worthington ............ | A61C 5/77 |
| | | | | 433/215 |
| 2006/0134577 A1 | * | 6/2006 | Zuk ...................... | A61C 19/003 |
| | | | | 433/29 |

(Continued)

FOREIGN PATENT DOCUMENTS

WO       WO-2015176004 A1 * 11/2015   .......... A61C 13/087

*Primary Examiner* — Thomas C Barrett
*Assistant Examiner* — Matthew P Saunders
(74) *Attorney, Agent, or Firm* — Brooks Kushman, P.C.

(57)          ABSTRACT

A dental crown and method of use thereof. According to the method provided herein, a dental crown is selected having an appropriate size and shape and an internal contour. The tooth to which the crown is to be applied is prepared to have an external contour. Composite material is injected into the internal contour of the dental crown. The dental crown is placed over the prepared tooth and the deposited composite material is cured using light.

20 Claims, 14 Drawing Sheets

(56)            References Cited

U.S. PATENT DOCUMENTS

| | | | |
|---|---|---|---|
| 2012/0100505 A1* | 4/2012 | Huynh | A61C 13/0001 |
| | | | 433/201.1 |
| 2012/0156650 A1* | 6/2012 | Glidewell | A61C 5/73 |
| | | | 433/223 |
| 2015/0111172 A1* | 4/2015 | Jung | A61C 5/77 |
| | | | 433/172 |
| 2019/0350677 A1* | 11/2019 | Sorenson | A61K 6/17 |
| 2020/0163741 A1* | 5/2020 | Lampl | A61C 13/09 |

* cited by examiner

Figure 1A:
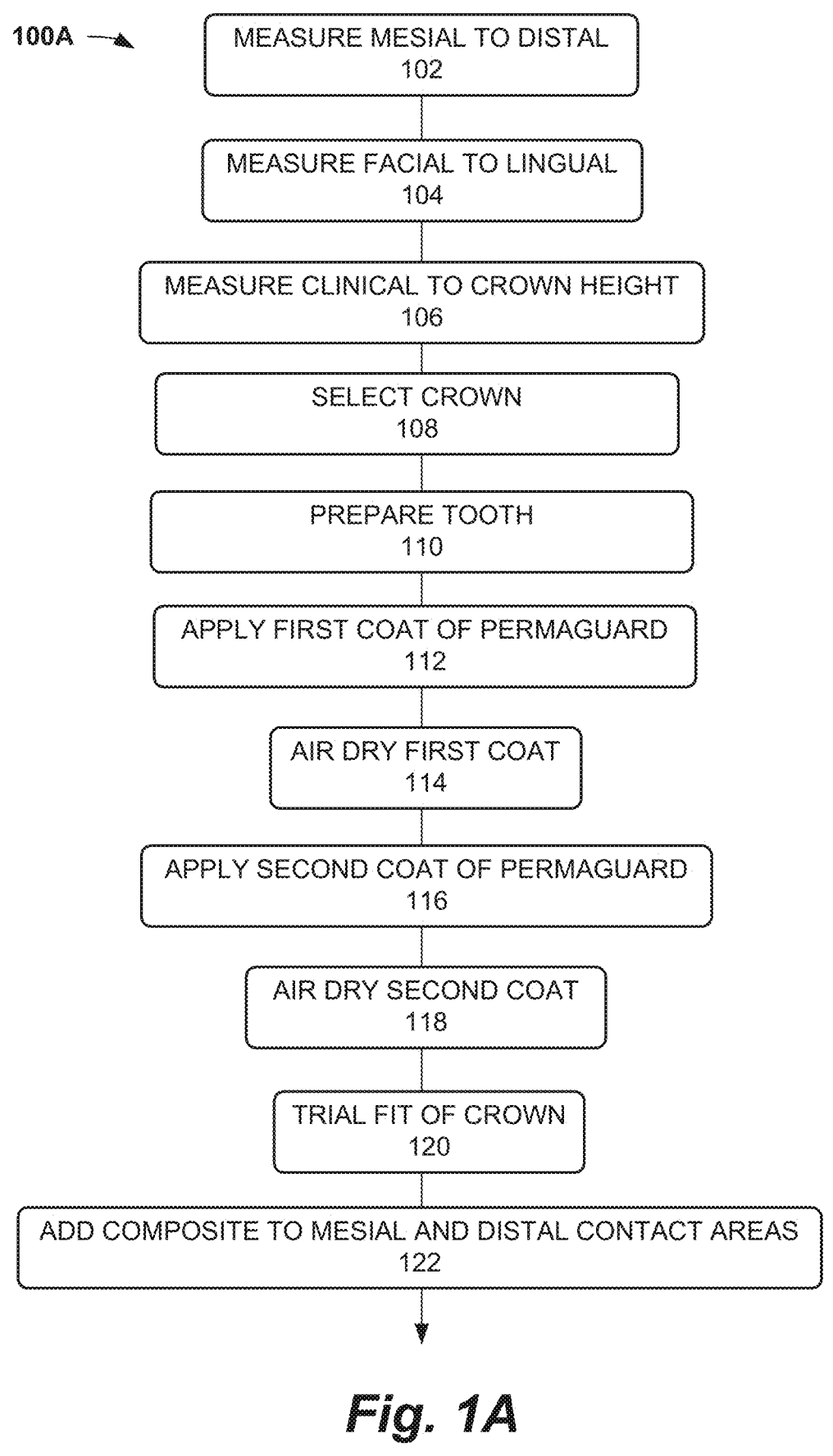

100A →

MEASURE MESIAL TO DISTAL
102

MEASURE FACIAL TO LINGUAL
104

MEASURE CLINICAL TO CROWN HEIGHT
106

SELECT CROWN
108

PREPARE TOOTH
110

APPLY FIRST COAT OF PERMAGUARD
112

AIR DRY FIRST COAT
114

APPLY SECOND COAT OF PERMAGUARD
116

AIR DRY SECOND COAT
118

TRIAL FIT OF CROWN
120

ADD COMPOSITE TO MESIAL AND DISTAL CONTACT AREAS
122

ADJUST COMPOSITE AND ZIRCONIA HASH MARKS
124

FINISH CONTACT AREA
126

PLACE PLASTIC BARRIER OVER PREPARED TOOTH
128

INJECT COMPOSITE
130

PLACE CROWN
132

TAP TO OCCLUSION
134

PARTIAL CURE
136

INJECT ADDITIONAL COMPOSITE
138

PLACE CROWN
140

ADAPT COMPOSITE TO MARGIN
142

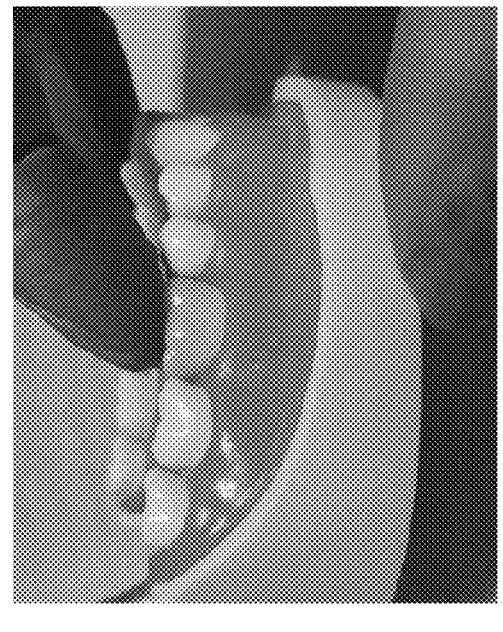
Fig. 11C
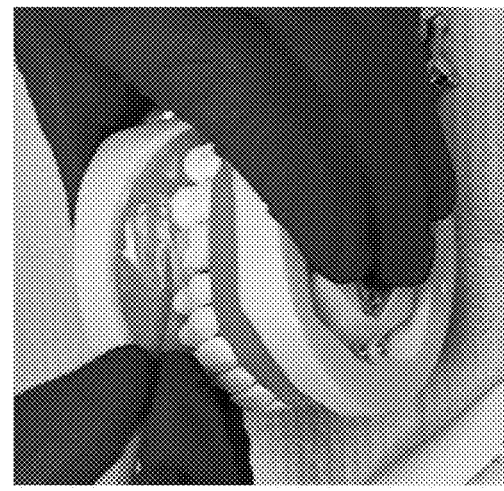
Fig. 11E
Fig. 11B
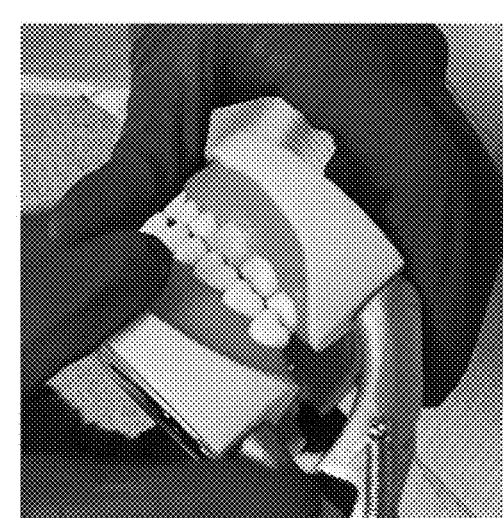
Fig. 11D
Fig. 11A

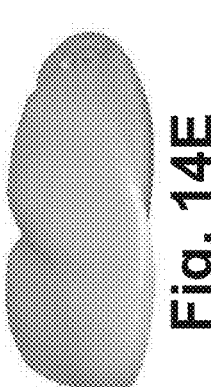
Fig. 14E
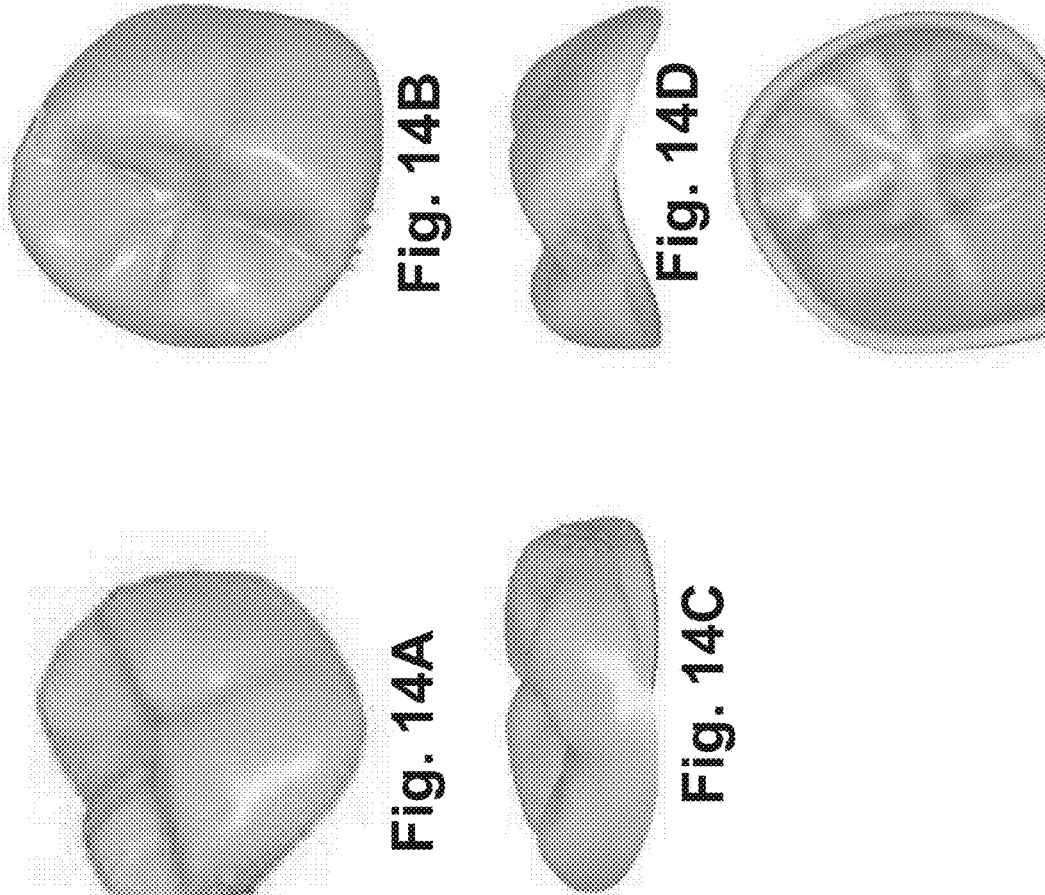
Fig. 14B
Fig. 14D
Fig. 14F
Fig. 14A
Fig. 14C

DENTAL CROWN AND METHOD OF USE

FIELD OF THE DISCLOSURE

The present disclosure generally relates to dental crowns and methods for using dental crowns.

BACKGROUND OF THE PRESENT DISCLOSURE

Currently there exists a large market for adult crowns to address the needs of uninsured, under-insured and dental clients travelling abroad to restore teeth for financial reasons. Many senior citizens and cancer patients have difficulty justifying the expense of paying for restoration of their teeth. According to public reports, tens of thousands of Americans travel out of the U.S. each year for the specific purpose of securing dental care at a reasonable cost. According to The National Association of Dental Plans, roughly 114 million Americans have no dental coverage at all, and approximately 46.3 million Americans over age 65 are uninsured. The large market indicated above is not limited only to the United States. It exists globally.

The conventional procedure currently used to restore a weak or diseased tooth requires at least two dentist visits and a one- to three-week wait for the crown to be made either in-house laboratory or at a contracted dental laboratory. A crown is a cap made to cover the decayed tooth. To prepare for crown, in the first visit, after X-ray examination and proper anesthetic application, dentists prepare to remove the decayed portion and shape the tooth for the crown. Dentists then take the impression of the prepared tooth and proceed with fabrication and cementation of temporary crown to protect the tooth until the permanent crown id available. Either the impression or the model poured in the impression is sent to the laboratory for the fabrication of crown from the desired materials. The second visit will include removal of temporary, anesthetic application, bonding and cementation of the permanent crown. Depending on the dentists and the location, a traditional crown can cost $800 to $2000 or more. In addition, in the current pandemic situations, there is a great need to minimize contacts between the patients, dental practitioners and their staff. There is also a need to introduce new features in dental devices and offices to address bacteria, viruses and odor.

SUMMARY OF THE PRESENT DISCLOSURE

The present disclosure is intended to address the above needs by providing functional, strong, biocompatible, pre-fabricated adult crowns at an affordable cost to the dental patients while at the same time increasing dentists' income. The disclosure is intended to enable dental practitioners to restore a tooth in single seating, one appointment and in less than 40 minutes. The present teachings may be provided in the form of a kit including an assortment of specially designed zirconia crowns of different sizes and shades per tooth with other optional products such as try-in crowns of different colors, FDA approved bonding agents and luting cement. Such a kit may further include specially designed tooth preparation and cementation guides, devices and tools, antimicrobial coatings, endodontic sealing and filling materials, and related components.

According to the present disclosure, and as set forth in detail herein, the dentist prepares the tooth to closely match the internal profile of the selected prefabricated crowns from the kit and continues for bonding and cementation using recommended procedures. A "try-in" crown may be used to determine the size of the crown required for the patient and to assist in tooth preparation, so as to procure clinically acceptable passive seating. A try-in crown also helps eliminate contamination and autoclaving of actual crowns to be cemented, as only the try-in crown needs to be autoclaved for future use.

Depending on the particular embodiment, the present disclosure may provide numerous advantages over the traditional methods. It may be completed in a single appointment. This means less chair time for dentists and patients, restoring a tooth in a single seating appointment of less than 40 minutes. The process involves little to no capital outlay for equipment and tools. It requires no impressions, scanning or models. The expense for anesthetics is reduced. The crowns and related materials are made of clinically-proven materials having long life and high biocompatibility. From a financial side, the patient's cost may be reduced while a dentist can see more patients per day. Further, the crown and its method of use may provide additional advantages to address bacteria, viruses and reduction of secondary decay.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The foregoing disclosure will be best understood and advantages thereof made most clearly apparent when consideration is given to the following detailed description in combination with the drawing figures presented. The detailed description makes reference to the following drawing figures:

FIG. 1A is a flowchart showing certain steps in a method of preparation of a dental crown according to the present disclosure;

FIGS. 11A through 11E show the process of final injection and placement of a crown according to the present disclosure;

FIGS. 14A through 14F show one embodiment of a crown suitable for use with the methods disclosed herein as viewed from a variety of viewpoints.

DETAILED DESCRIPTION OF THE DISCLOSURE

The following detailed description provides certain specific embodiments of the subject matter disclosed herein. Although each embodiment represents a single combination of elements, the subject matter disclosed herein should be understood to include sub-combinations of the disclosed elements. Thus, if one embodiment comprises elements A, B, and C, and a second embodiment comprises elements B and D, then the inventive subject matter is also intended to include other remaining combinations of A, B, C, or D, even if not explicitly disclosed herein.

The present disclosure provides a new solution for dental providers seeking an option to treat severely broken-down teeth needing buildup or coronal stabilization and strengthening. If a more conservative tooth preparation is possible requiring less enamel removal, a custom fabricated restoration should be given consideration. However, an increasing array of molar and bicuspid teeth can be successfully restored in under an hour in the dental office with no need for a transfer impression, temporization or returning the crown to the lab for reglazing because occlusal adjustments were made prior to cementation.

The present disclosure allows the dentist to offer durable full coverage zirconia posterior crown at a fraction of the cost of a custom fabricated crown. One of the major advantages in using the present disclosure is the savings in total cost of service to the dental practice owner.

FIG. 1A is a flowchart 100A showing certain steps 102-122 in a method of preparation of a dental crown according to the present disclosure. The first step is to determine the correct tooth form to use as a restoration. This is done by measuring the distance between the contacts of the tooth to be crowned. Second measure the facial (buccal)—lingual aspect of the tooth to be crowned. Using the table select the crown form that is indicated. This is represented beginning in step 102 of the flowchart, wherein the existing tooth is measured along the mesial-to-distal direction on occlusion. This step is shown visually in FIGS. 2A and 2D. As can be seen in FIGS. 2A-2F, measurement of the tooth can be made using a caliper or a graduated ruler, as examples.

Figure 2B:
FIGS. 2A through 2F show the process of measuring a tooth for fitment according to the present disclosure.
Figure 2A:
Figure 2C:
Figure 2E:
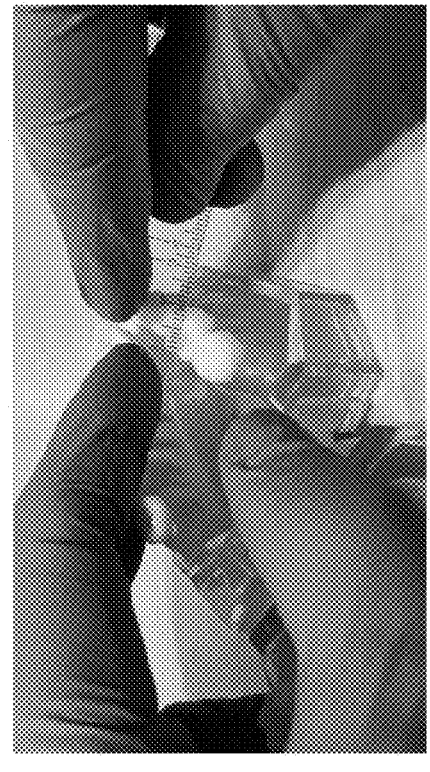
Figure 2D:
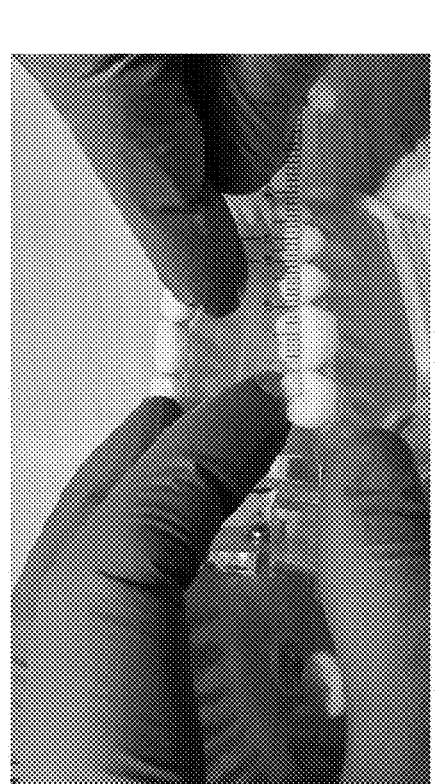
Figure 2F:
Figure 3A:
FIGS. 3A through 3D show the process of measuring a crown for fitment according to the present disclosure.
Figure 3B:
Figure 3C:
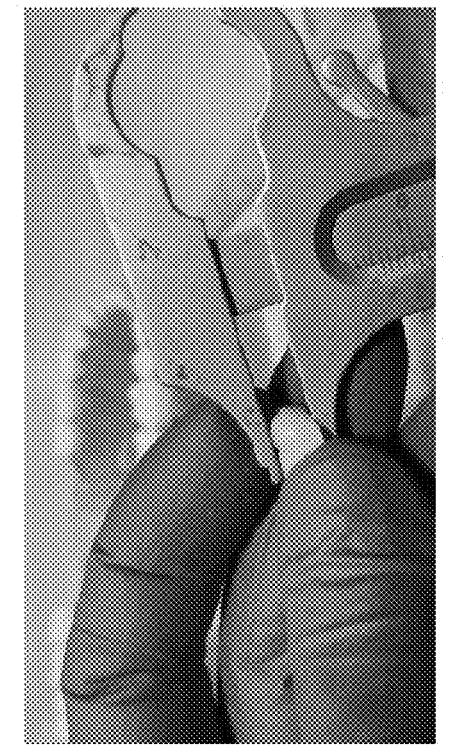
Figure 3D:

In step 104, the existing tooth is measured along the facial-to-lingual direction. This step is shown in FIGS. 2B and 2E. In step 106, the existing tooth is measured from clinical to crown height. This step is shown in FIGS. 2C and 2F.

In step 108, a crown is selected and measured for proper fitment. This step is shown in FIGS. 3A through 3D. According to certain embodiments of the present disclosure, multiple crown sizes may be provided. The shade of the crown may be adjusted using a glazing oven.

Figure 4C:
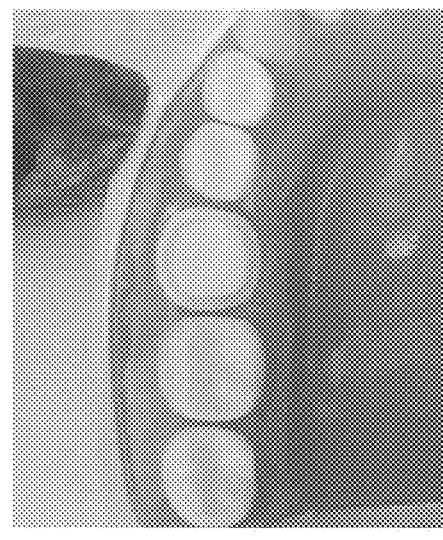
FIGS. 4A through 4E show the process of preparing a tooth according to the present disclosure.
Figure 4E:
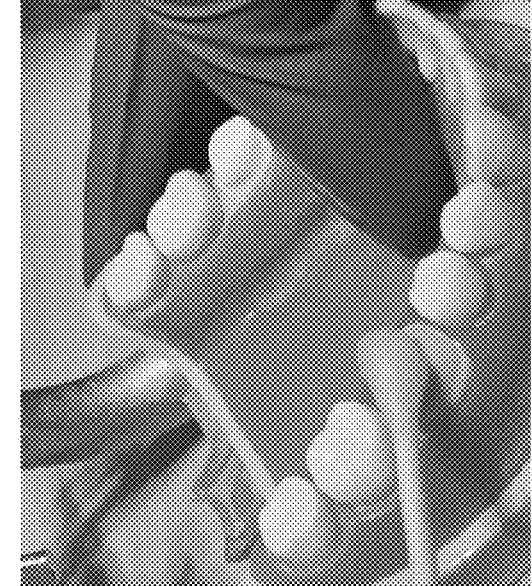
Figure 4B:
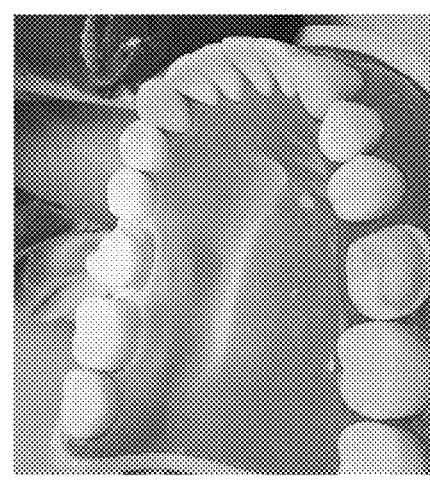
Figure 4A:
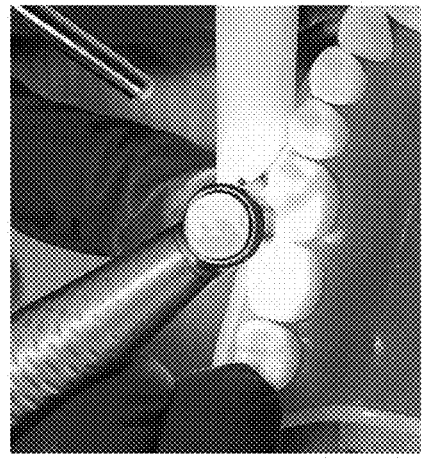

In step 110, the tooth is prepared to receive a crown. This step is shown in FIGS. 4A through 4C. Tooth preparation is similar to standard crown reduction guidelines. In some cases, it may be necessary to reduce the occlusal aspects of the tooth more than for a gold base crown. It is important to remove decay, base and build-up missing tooth structure to remove undercuts in the path of draw.

Figure 5B:
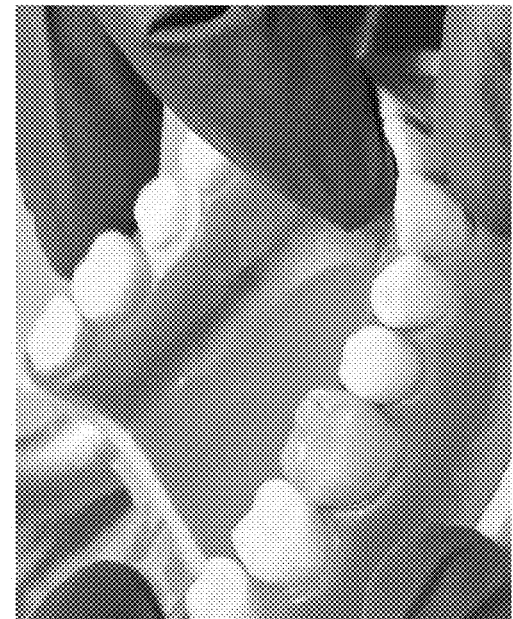
FIGS. 5A through 5C show the process of placing a crown according to the present disclosure.
Figure 5C:
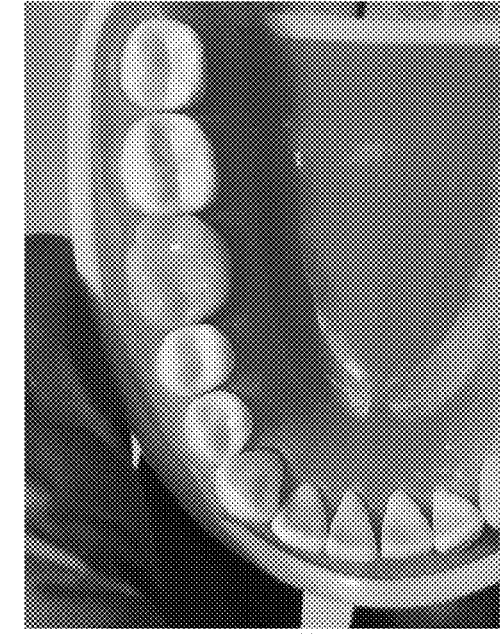
Figure 5A:
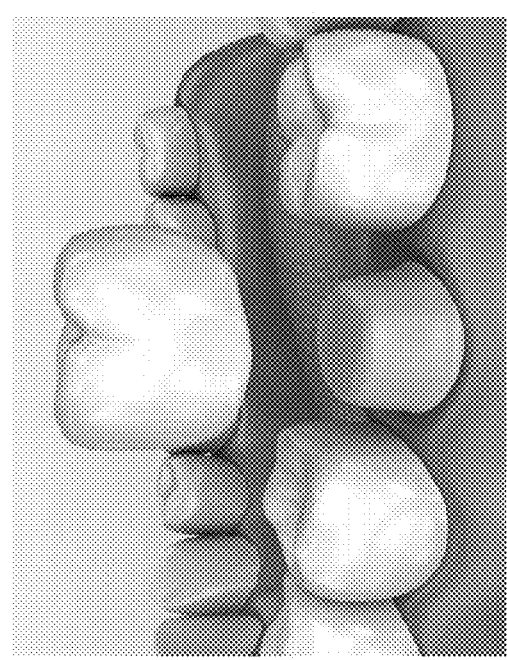
Figure 6B:
FIGS. 6A through 6C show the process of checking crown fitment according to the present disclosure.
Figure 6C:
Figure 6A:

A 0.5 mm chamfer is placed circumferentially above the gingival margin. Occlusal reduction is greater than 1 mm-1.75 mm from occlusal contact points. There will be more cuspal reduction than normal molar prep. The occlusal reduction is relatively flat. While not completely flat, the occlusal surface of the tooth is flatter than the standard dental preparation, as can be seen in FIG. 5A.

Facial reduction is approximately 1.25 mm. Lingual reduction is approximately 1 mm. Mesial contact is approximately 1 mm. Distal contact is approximately 1 mm. A 0.5 mm chamfer will be placed above the gingival margin but below the facial height of contour.

In cases where the decay has affected the gingival area and an ideal chamfer margin cannot be placed at or just above the gingival margin the area of infection should be treated as a standard gingival composite filling. It is recommended a mylar retainer be used to protect the area while placing the composite. The composite restoration should approximate the natural contour of the tooth, keeping in mind that the crown will need a smooth transition to the composite restoration.

The dentin or enamel is acidified with a weak acid solution for approximately 10 seconds. A citric acid solution of approximately 5-15% has been used successfully for this purpose, but it is believed that many acids could be used, including acetic or phosphoric, as examples. It is believed that etching gel could also be used for this purpose.

Figure 4D:
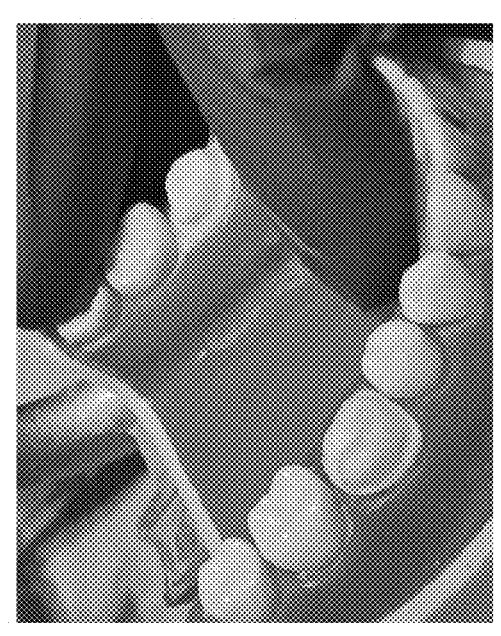

It is preferred that the prepared tooth surface be thoroughly treated with dentin guard (also referred as "Permaguard" or "dimensionally-engineered nanoparticle solution") before applying the dentin bonding agent for the restoration. Once the dentin guard is placed and the restoration placed the margin chamfer can be placed in an ideal position to receive the crown. In step 112, a first coat of dimensionally-engineered nano-particle solution is applied to the prepared tooth. This step is shown in FIGS. 4D and 4E.

The composition of the dimensionally-engineered nanoparticle solution may vary by application. According to one embodiment, the solution includes approximately 10-25 parts per million gold and 10-60 parts per million silver in a carrier solution. In one embodiment, the carrier solution is approximately 90% deionized water and 10% isopropyl alcohol. One specific formulation comprises 10 parts per million irregularly shaped and sized 50 nm gold particles and 20 parts per million engineered spherical silver nanoparticles surrounded with an $Ag_4O_4$ tetrahedral coating. Other noble metals, such as platinum and palladium, may work in place of gold and other oxides may work in place of $Ag_4O_4$. As an example, $SiO_2$ may work, but this has not been successfully tested.

The prepared tooth is cleaned with water and air spray to remove blood and saliva. The tooth should be isolated with tongue retraction and cotton rolls. In a dappen dish, two drops of gold solution are mixed with two drops of silver solution, according to one embodiment. These solutions have about 50% alcohol to encourage rapid evaporation of the solution along with immediate sanitization of the prepared dentin. They also have high concentrations of engineered nano-gold and silver particles. These particles are highly antimicrobial and in combination will stay in place indefinitely. The prepared tooth is lightly dried but not desiccated. The solution is liberally applied to the prepared tooth using forceps and a cotton pellet or brush.

In step 114, the first coat of dimensionally-engineered nano-particle solution is air dried for approximately 30 seconds. In step 116, a second coat of dimensionally-engineered nano-particle solution is applied to the prepared tooth, in the manner shown in FIGS. 4D and 4E. In step 118, the second coat of dimensionally-engineered nano-particle solution is air dried for approximately 30 seconds. Then a thin coating of dentin bonding agent is applied and dried with clean dry air for approximately 5 seconds.

In step 120, the selected crown is trial fitted over the prepared tooth and the gaps measured in order to confirm proper fitment. This step is shown in FIGS. 5A through 5C and FIGS. 6A though 6C. The crown should passively fit the preparation and there should not be occlusal contact at this initial fitment. The crown should be checked for passive fit, particularly in the occlusal. The crown form should not bind in any direction. Having insured the crown will passively cover the underlying prepared tooth and closely approximate the margin prepared on the tooth, the crown should be checked for occlusion. The crown form may sit low enough that the opposing occlusion does not contact the crown. In this case, proceed to check the mesial and distal contacts. In step 122, composite is added, if necessary, to the mesial and distal contact areas.

Figure 1B:
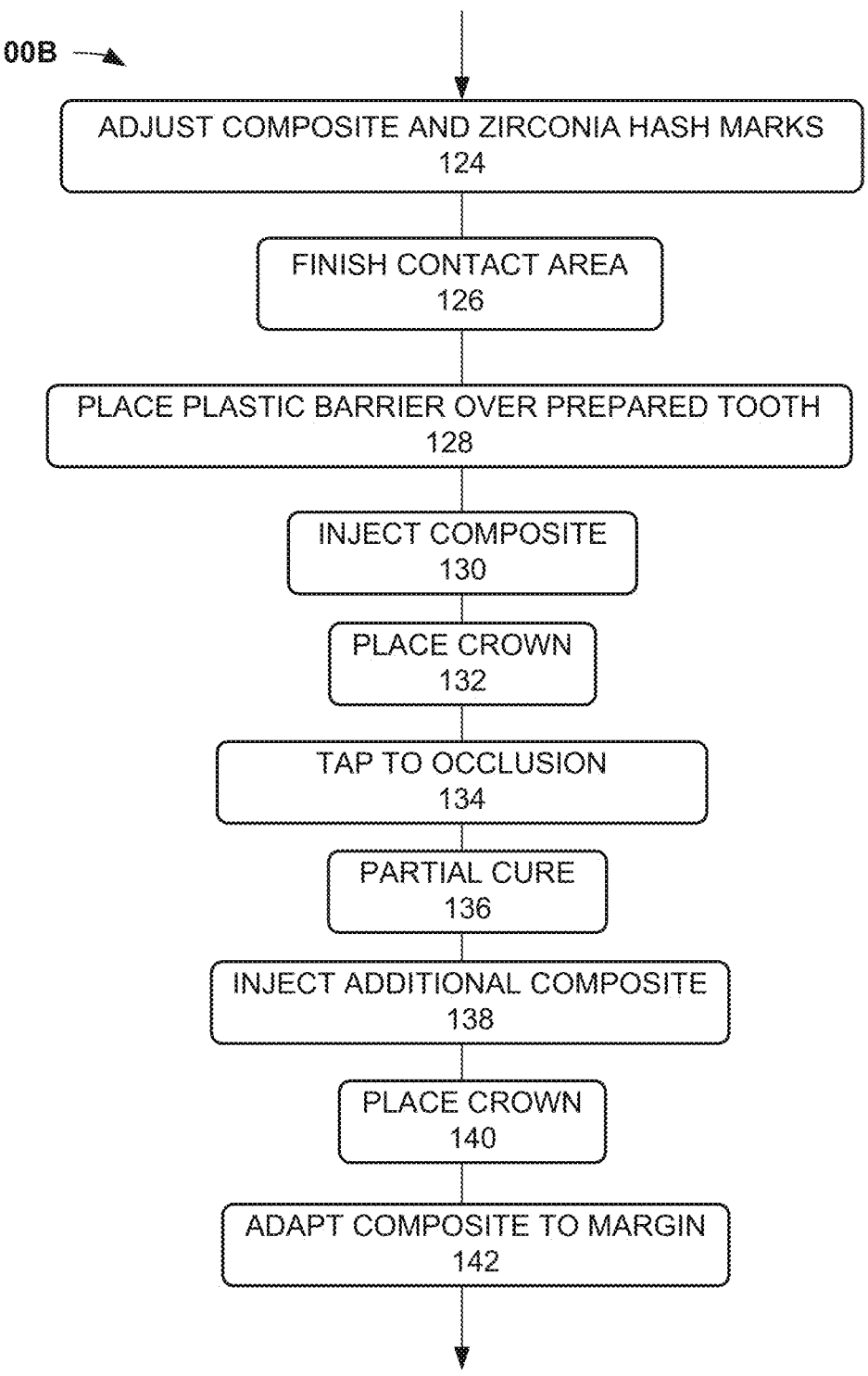
FIG. 1B is a flowchart showing certain additional steps in a method of preparation of a dental crown according to the present disclosure.
Figure 7B:
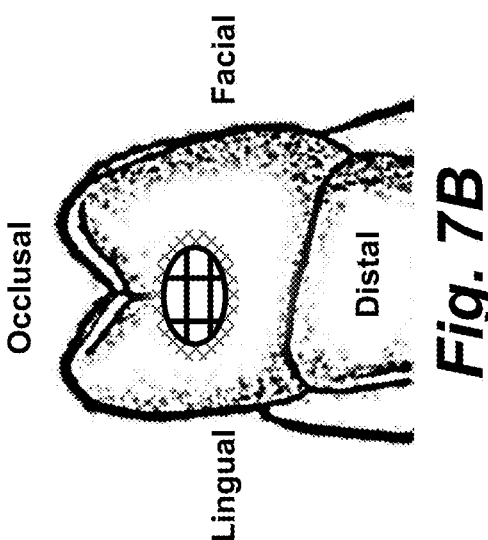
FIGS. 7A and 7B show a crown in place from the mesial and distal directions according to the present disclosure.
Figure 7A:
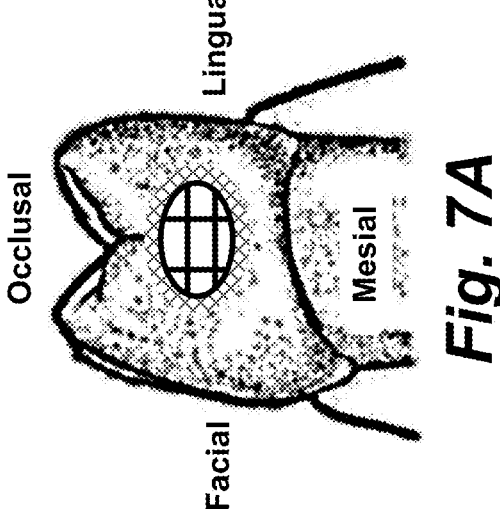

FIG. 1B is a flowchart 100B showing certain additional steps 124-142 in a method of preparation of a dental crown according to the present disclosure. In step 124, the composite and zirconia hash marks are adjusted as necessary. In step 126, the contact area is finished as necessary. The mesial and distal contact areas are shown in FIGS. 7A and 7B.

Additional details of a suitable crown are shown in FIGS. 14A-14F. The design may have a positive dimension from the external surface profile of the crown. The design such as a hashtag in a circular ridge will easily hold composite and adapt to the proximal tooth contact area. A thin ridge shape allows for easy and rapid adjustments as needed for each side of the contact. The contact area also allows for contact to be adapted with composite to irregular and difficult shaped contact.

Having now established that the crown form will fit snugly mesial-distally and does not cause binding on the underlying tooth preparation when in occlusion, the crown can now be customized to a more perfect fit to the tooth preparation.

Figure 8B:
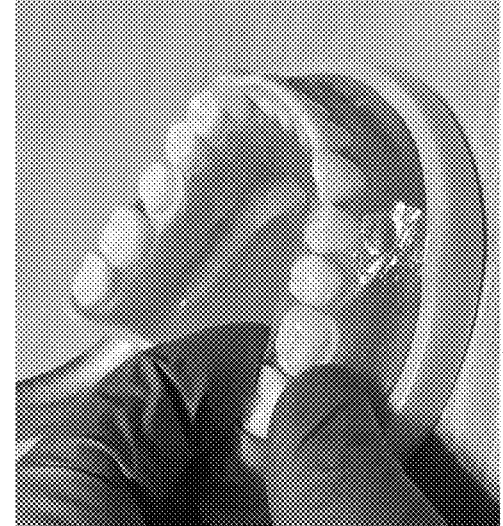
FIGS. 8A and 8B show the process of placing protective film over the prepared tooth according to the present disclosure.
Figure 8A:
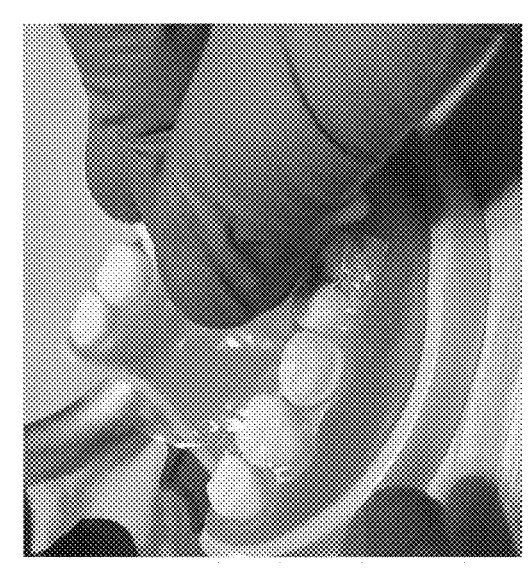
Figure 9B:
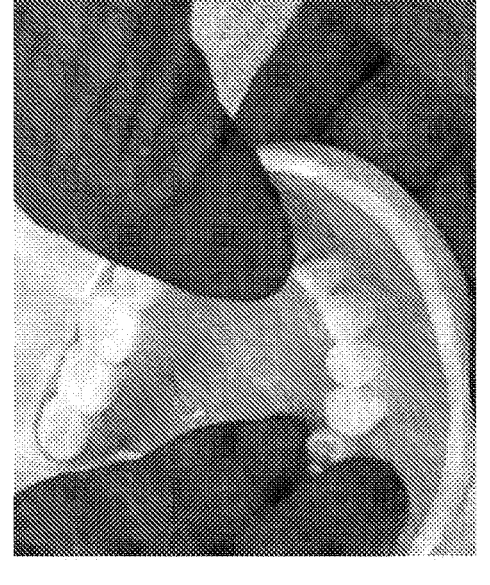
FIGS. 9A through 9C show the process of partial injection and initial cure according to the present disclosure.
Figure 9A:
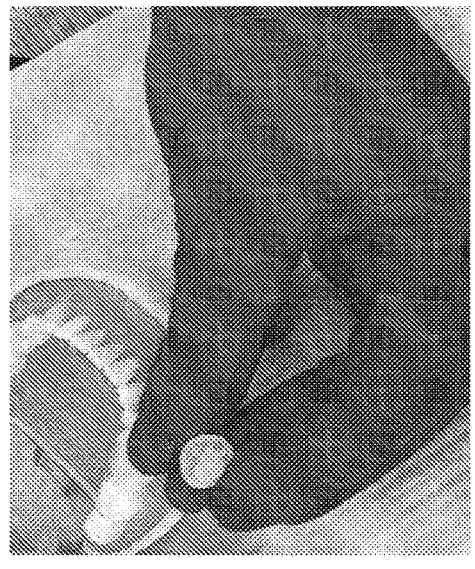
Figure 9A:
Figure 9C:

In step 128, a removable plastic barrier is placed over the prepared tooth and gingiva. This step is shown in FIGS. 8A and 8B. In step 130, the crown is partially injected with curable composite. According to one embodiment, the crown is injected with sufficient composite to fill the crown approximately 25%. This step is shown in FIG. 9A. In step 132, the crown is set into place over the prepared tooth, as shown in FIG. 9B. In step 134, the patient is brought slowly into centric relation and the crown is tapped to occlusion, as shown in FIG. 9C.

Figure 10:
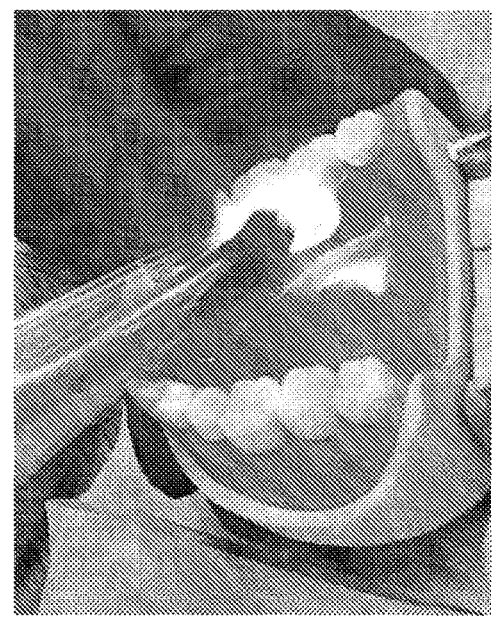
FIG. 10 shows partial composite curing according to the present disclosure.

In step 136, the partial composite is cured. This step is shown in FIG. 10. According to one embodiment, the composite is cured for approximately 30 seconds. The curing process may vary depending on the nature of the composite. In the embodiment shown in FIG. 10, the composite is an ultraviolet-curable composite being cured with ultraviolet light.

In step 138, additional composite is injected into the crown. This step is shown in FIG. 11A. According to one embodiment, the crown is injected with sufficient composite to fill the crown approximately 75%.

In step 140, the crown is set in place and pressed into occlusion, and the patient taps down to ensure the crown is completely seated. This step is shown in FIGS. 11B-11D.

In step 142, the composite is adapted to the prepared tooth margin. This step is shown in FIG. 11E.

Figure 1C:
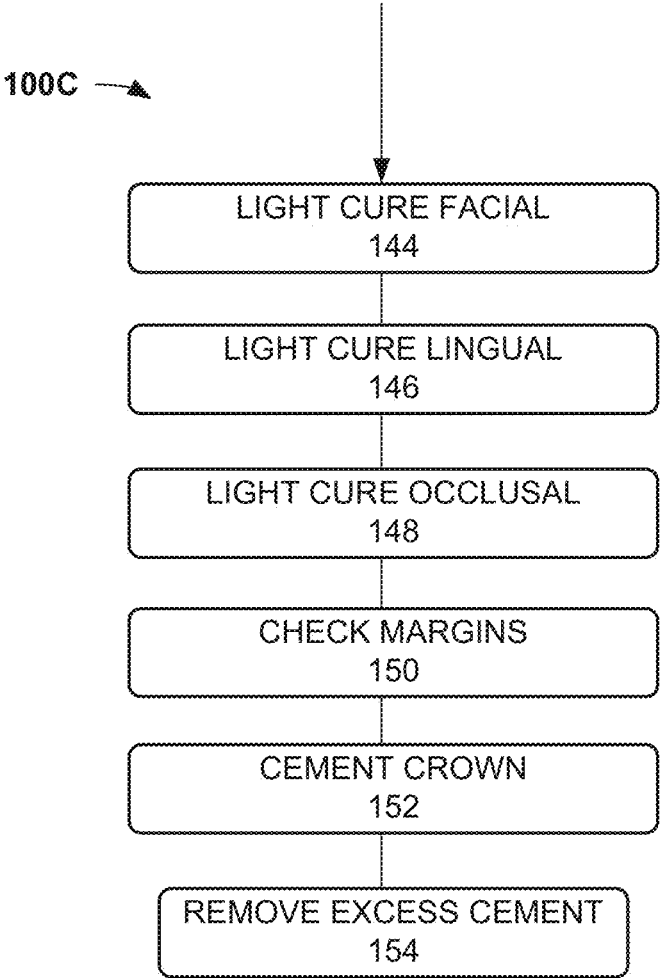
FIG. 1C is a flowchart showing certain additional steps in a method of preparation of a dental crown according to the present disclosure.
Figure 12C:
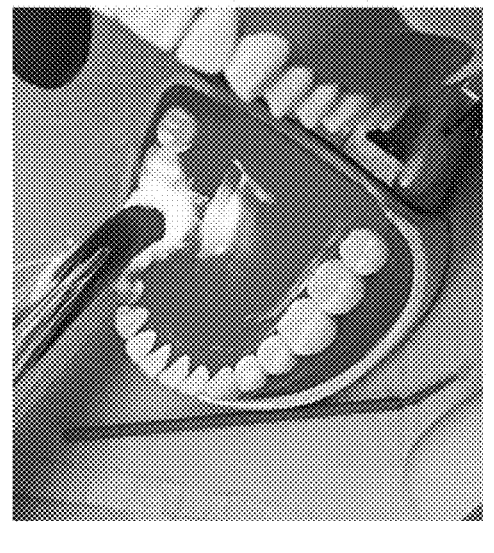
FIGS. 12A through 12C show the process of final cure according to the present disclosure.
Figure 12B:
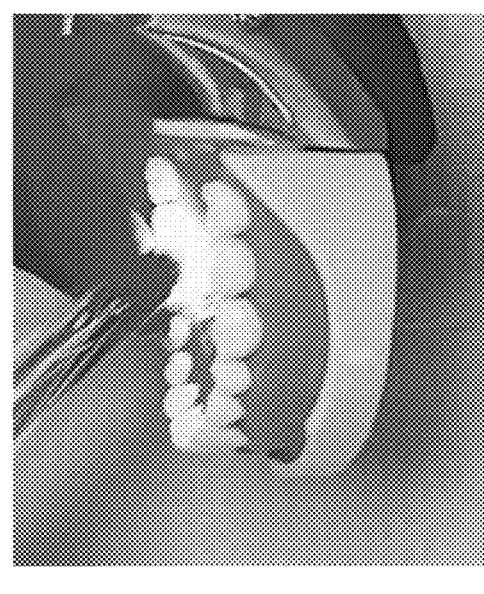
Figure 12A:

FIG. 1C is a flowchart 100C showing certain additional steps 144-154 in a method of preparation of a dental crown according to the present disclosure. In step 144, the composite is cured from the facial side. This step is shown in FIG. 12A. In step 146, the composite is cured from the lingual side. This step is shown in FIG. 12B. In step 148, the composite is cured from the occlusal direction. This step is shown in FIG. 12C. According to one embodiment, the composite is cured for approximately 30 seconds per side. As above, while these figures depict ultraviolet-curable composite being cured with ultraviolet light, alternate composites and curing methods may be employed in alternate embodiments.

Figure 13C:
FIGS. 13A through 13C show the process of final margin cleanup according to the present disclosure.
Figure 13B:
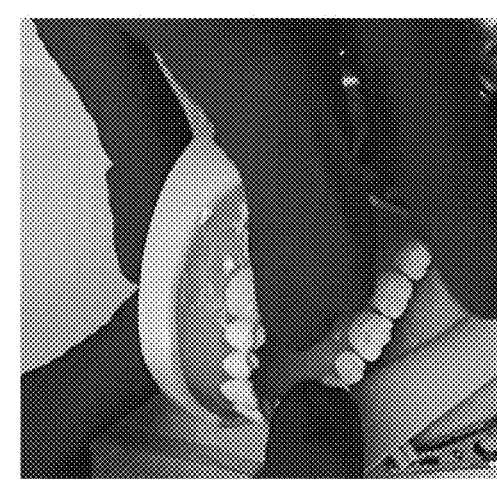
Figure 13A:
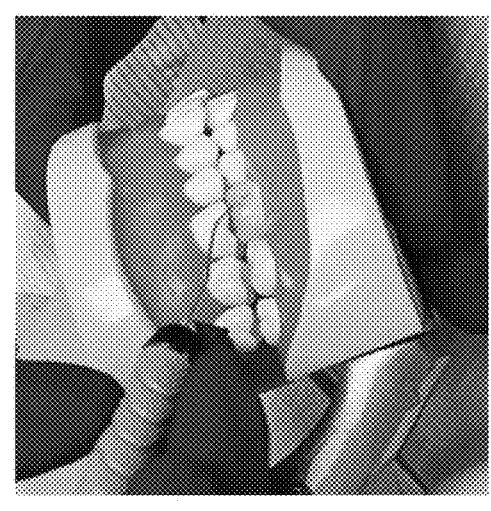

In step 150, the margins are checked, as shown in FIG. 13A. In step 152, the crown is cemented using zirconia cementing composite, as shown in FIG. 13B. In step 154, excess cement is removed from the margin. This step is shown in FIG. 13C.

In certain embodiments, a biopolymer may be applied to the crown as a final stage of the process. An example of a suitable biopolymer is the material sold under the brand name DentaKote by Dentity Global, LLC of Boca Raton, Fla. The biopolymer may be a gel material formulated to bond to hard surfaces in the oral cavity. Such a biopolymer serves to prevent the adhesion of bacteria and debris from adhering to the surface. The surface coated with the biopolymer provides a non-stick surface for oral bacteria and debris. The coating itself may be as thin as one micron thick. The biopolymer may be provided in a preloaded brush that has enough material to cover the dental surfaces. The use of a biopolymer may serve to prevent bacterial attachment to the exposed surface of the implant.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A method of preparing a dental crown to restore a tooth during a procedure time less than or equal to one hour, the method comprising:

selecting, during the procedure time, a dental crown from among an assortment of dental crowns in accordance with one or more tooth measurements of the tooth to receive selected dental crown, the selected dental crown having a contact adjuster feature that is at at least one of mesial contact or distal contact areas and is a physical profile feature that includes a physical indentation defined by a ridge at an external surface of the dental crown with the external surface forming a base surrounded by the ridge to hold material;

preparing, during the procedure time, the tooth to have an external contour that passively fits an internal portion of the selected dental crown;

depositing, during the procedure time, composite material in the physical indentation of the contact adjuster feature to define an outer contour of the at least one of mesial contact or distal contact and to adjust a space between the at least one of mesial contact or distal contact areas of the selected dental crown and a tooth adjacent to the tooth that has been prepared during a trial fit of the selected dental crown on the tooth that has been prepared;

depositing, during the procedure time, composite material into the internal portion of the selected dental crown;

placing, during the procedure time, the selected dental crown on the tooth that has been prepared to define an internal contour of the selected dental crown that conforms to the tooth that has been prepared; and at least partially curing, during the procedure time, the composite material deposited at at least one of the contact adjuster feature or the internal portion of the selected dental crown using light.

2. The method of claim 1, wherein at least one of the selected dental crown or the composite material deposited at the contact adjuster feature and at the internal portion of the selected dental crown has antimicrobial properties to reduce at least one of bacteria, virus, or secondary decay.

3. The method of claim 1, further comprising measuring, during the procedure time, the one or more tooth measurements of the tooth to receive the dental crown.

4. The method of claim 3, wherein the one or more tooth measurements of the tooth include at least one of a measurement along mesial-to-distal direction on occlusion, a measurement along a facial-to-lingual direction, or a measurement from clinical-to-crown height.

5. The method of claim 1, further comprising applying a solution having antimicrobial properties to the prepared tooth.

6. The method of claim 1, further comprising applying a solution having antimicrobial properties to the selected dental crown after the at least partially curing of the composite material.

7. The method of claim 1, further comprising placing a physical barrier over the prepared tooth prior to the selected dental crown having the composite material deposited in the internal portion.

8. The method of claim 1, further comprising applying a solution having noble metal to the prepared tooth prior to the trial fit of the selected dental crown.

9. The method of claim 8, wherein the solution is a nano-particle solution defined by water, alcohol, and the noble metal, the noble metal including at least one of silver, gold, platinum, or palladium.

10. The method of claim 1, wherein an impression process, a scanning process, a model defining process, and a temporization process is excluded during the procedure time.

11. The method of claim 1, wherein the contact adjuster feature has a positive dimension from the external surface of the dental crown.

12. The method of claim 1, wherein the contact adjuster feature includes a hashtag at the base.

13. A method of preparing a dental crown to restore a tooth within a procedure time, the method comprising:

selecting, during the procedure time, a dental crown from among an assortment of dental crowns in accordance with one or more tooth measurements of the tooth to receive selected dental crown, wherein each dental crown among the assortment of dental crowns has a contact adjuster feature that includes a physical indentation defined by a ridge at an external surface of the dental crown with the external surface forming a base surrounded by the ridge to hold material and is at at least one of mesial contact or distal contact areas;

preparing, during the procedure time, the tooth to have an external contour that passively fits an internal portion of the selected dental crown;

performing, during the procedure time, a trial fit of the selected dental crown, the trial fit further including:

placing the selected dental crown onto prepared tooth;

depositing composite material in the physical indentation of the contact adjuster feature of the at least one of mesial contact or distal contact areas of the selected dental crown to define an outer contour of the at least one of mesial contact or distal contact and to adjust a space between the at least one of mesial contact or distal contact areas and a tooth adjacent to the prepared tooth; and removing the selected dental crown from the prepared tooth;

depositing, during the procedure time, composite material into the internal portion of the selected dental crown;

placing, during the procedure time, the selected dental crown on the tooth that has been prepared to define an internal contour of the selected dental crown that conforms to the tooth that has been prepared; and at least partially curing, during the procedure time, the composite material deposited at at least one of the contact adjuster feature or the internal portion of the selected dental crown using light.

14. The method of claim 13, wherein at least one of the selected dental crown or the composite material deposited at the contact adjuster feature and at the internal portion of the selected dental crown has antimicrobial properties to reduce at least one of bacteria, virus, or secondary decay.

15. The method of claim 13, further comprising measuring, during the procedure time, the one or more tooth measurements of the tooth to receive the dental crown.

16. The method of claim 15, wherein the one or more tooth measurements of the tooth include at least one of a measurement along mesial-to-distal direction on occlusion, a measurement along a facial-to-lingual direction, or a measurement from clinical-to-crown height.

17. The method of claim 13, further comprising applying a solution having antimicrobial properties to at least one of the prepared tooth prior to the trial fit or the selected dental crown after the at least partially curing of the composite material.

18. The method of claim 17, wherein the solution is a nano-particle solution defined by water, alcohol, and a noble metal, the noble metal including at least one of silver, gold, platinum, or palladium.

19. The method of claim 13, wherein an impression process, a scanning process, a model defining process, and a temporization process is excluded during the procedure time.

20. The method of claim 13, wherein the contact adjuster feature includes a hashtag at the base.

\* \* \* \* \*